June 24, 1969 N. P. GRELLER 3,451,525
SORTING CONVEYOR

Filed Aug. 10, 1967 Sheet 1 of 4

INVENTOR
NELSON P. GRELLER

BY

ATTORNEYS

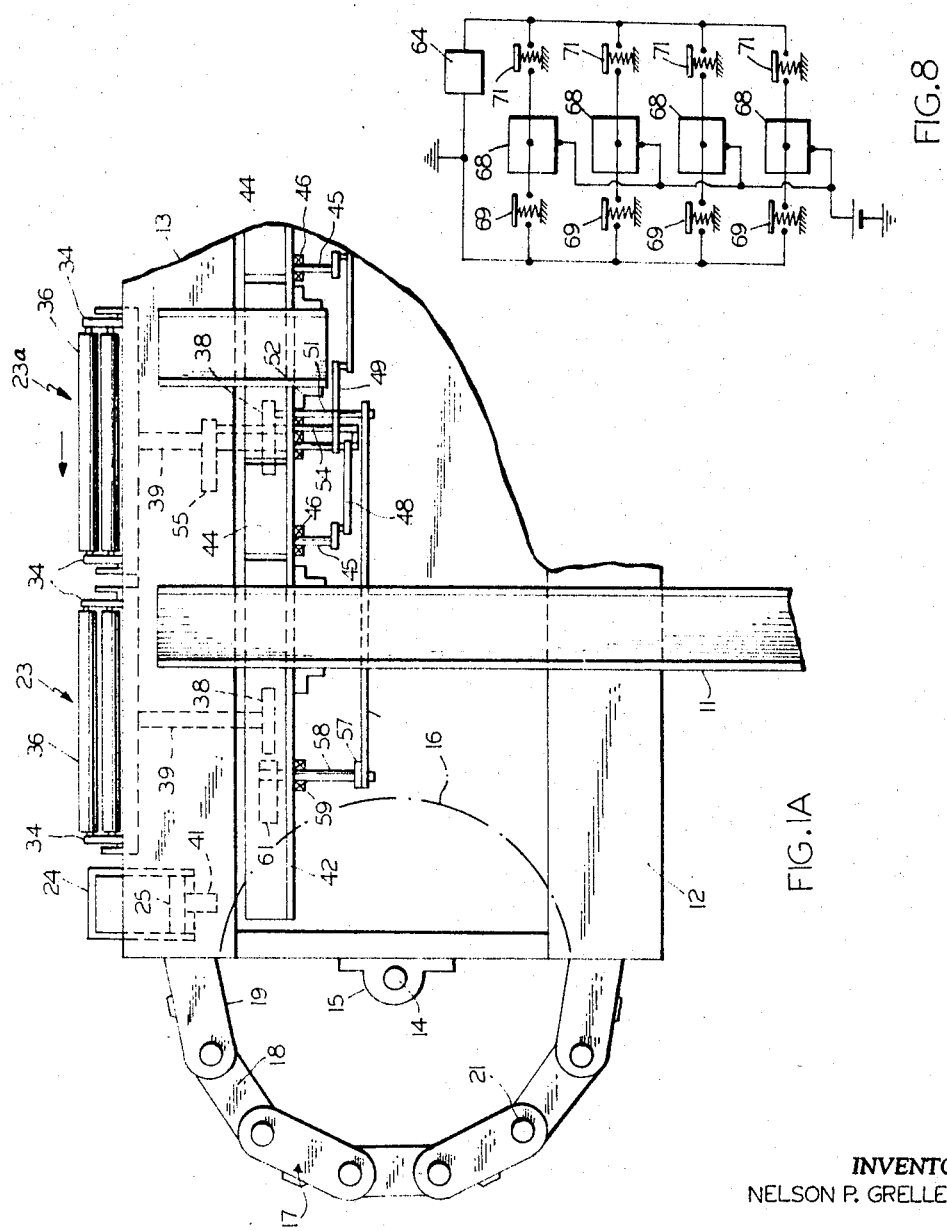

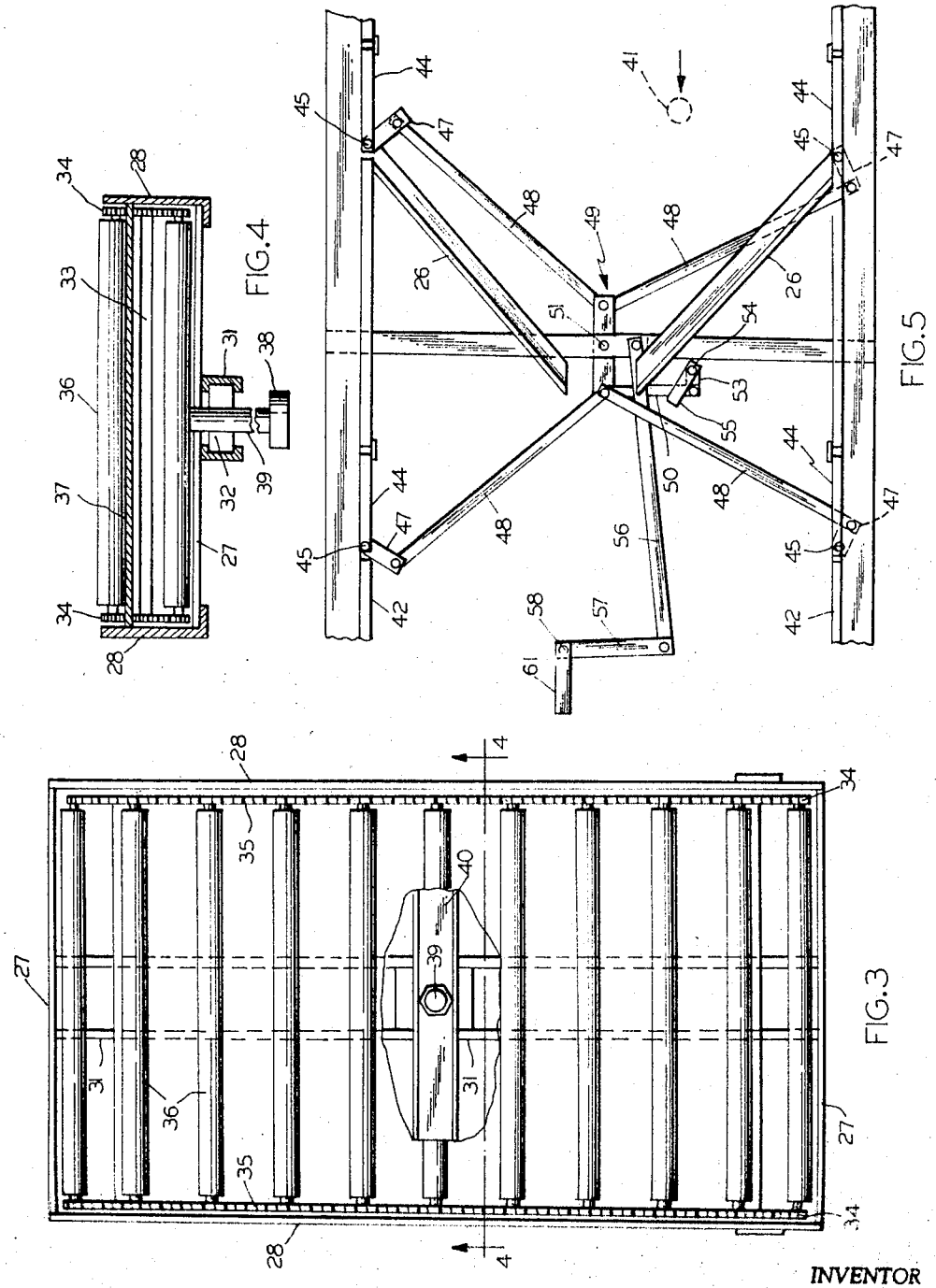

United States Patent Office 3,451,525
Patented June 24, 1969

3,451,525
SORTING CONVEYOR
Nelson P. Greller, 2800 Allendale Place, NW.,
Washington, D.C. 20008
Filed Aug. 10, 1967, Ser. No. 659,661
Int. Cl. B65g *13/02, 17/24*
U.S. Cl. 198—38                                                4 Claims

ABSTRACT OF THE DISCLOSURE

The disclosure relates to a sorting conveyor in which the conveyed articles can be removed laterally over either side of the conveyor at a selected one of a plurality of removal stations. The conveyor includes a series of article receiving platforms. Each platform includes an endless series of rollers carried by a conveyor-carried frame. The frame includes a transverse guideway along with a slide, connected with said series of rollers, is moved by cam means located at the removal station. The individual rollers in the upper run of the series of rollers are caused to rotate by a surface across which they are moved by movement of the slide along the guideway whereby the article which rests directly on the rollers is moved at a rate equal to twice that of the slide. Thus, the slide need move only halfway across the conveyor to move an article, resting at one side of the conveyor, completely across the conveyor to to remove it.

Background and summary of the invention

This invention relates to a sorting conveyor in which actuation of the article removing means is similar to that shown in U.S. Patent No. 2,868,394. While the conveyor shown in that patent is easily adaptable to afford removal of articles to either side, if the removal stations are opposite one another, the cam rails must intersect and it is necessary to provide some type of crossover means to guide the cam followers through the point of intersection. This complication is avoided by the present invention in that the article is caused to move at a rate equal to twice that of the cam follower which actuates it. This means the cam follower need travel only half the width of the conveyor, and the need for a crossover is eliminated.

The conveyor includes an endless conveyor apron such as a conventional slat conveyor. Some of the slats are replaced by article carrying platforms. These platforms are preferably arranged in pairs to simplify carrying them around the sprockets at the opposite ends of the chain-driven slat conveyor. Each platform includes a transverse guideway which is connected at its opposite ends to the end members of a generally rectangular frame. This frame carries at each side of the conveyor a sprocket shaft lying parallel with the direction of conveyor movement. A pair of endless chains is trained around the sprockets carried by these shafts. Suitably journalled to these chains is a plurality of parallel rollers which extend longitudinally of the conveyor. These rollers form an endless series including an upper and a lower run. A slide, guided for sliding movement along the transverse guideway, is connected to the lower run. A cam follower depends from the slide so as to be engaged by appropriately placed stationary cam rails, there being one cam rail at each removal station. The endless series of rollers is moved by the travel of the slide along the guideway. As incident to such movement, the rollers in the upper run are caused to rotate so that an article resting on them moves laterally at a rate equal to twice the rate of lateral movement of the slide. This means the article moves the full width of the conveyor as the slide moves halfway across the conveyor.

Description of the drawings

The invention will be more fully understood by reference to the accompanying drawings of a preferred embodiment.

FIG. 1A is a fragmentary side elevation of one end of the conveyor.

FIG. 3 is a top plan view of an article carrying platform.

FIG. 4 is a section on the line 4—4 of FIG. 3.

FIG. 5 is a top plan view showing the cam rails and switches at two laterally aligned removal stations.

FIG. 8 is a diagram of the control circuit.

Description of the preferred embodiment

Figure 1:
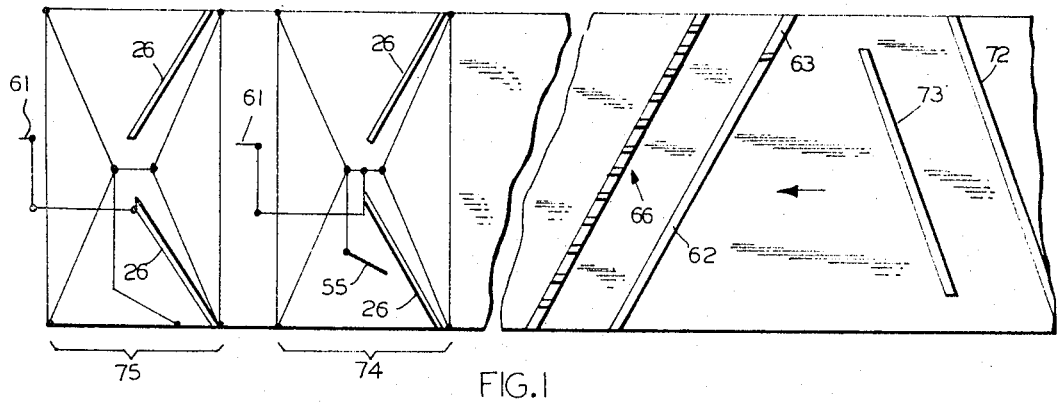
FIG. 1 is a diagrammatic representation of the essential parts of two removal stations of a conveyor embodying the invention.
Figure 2:
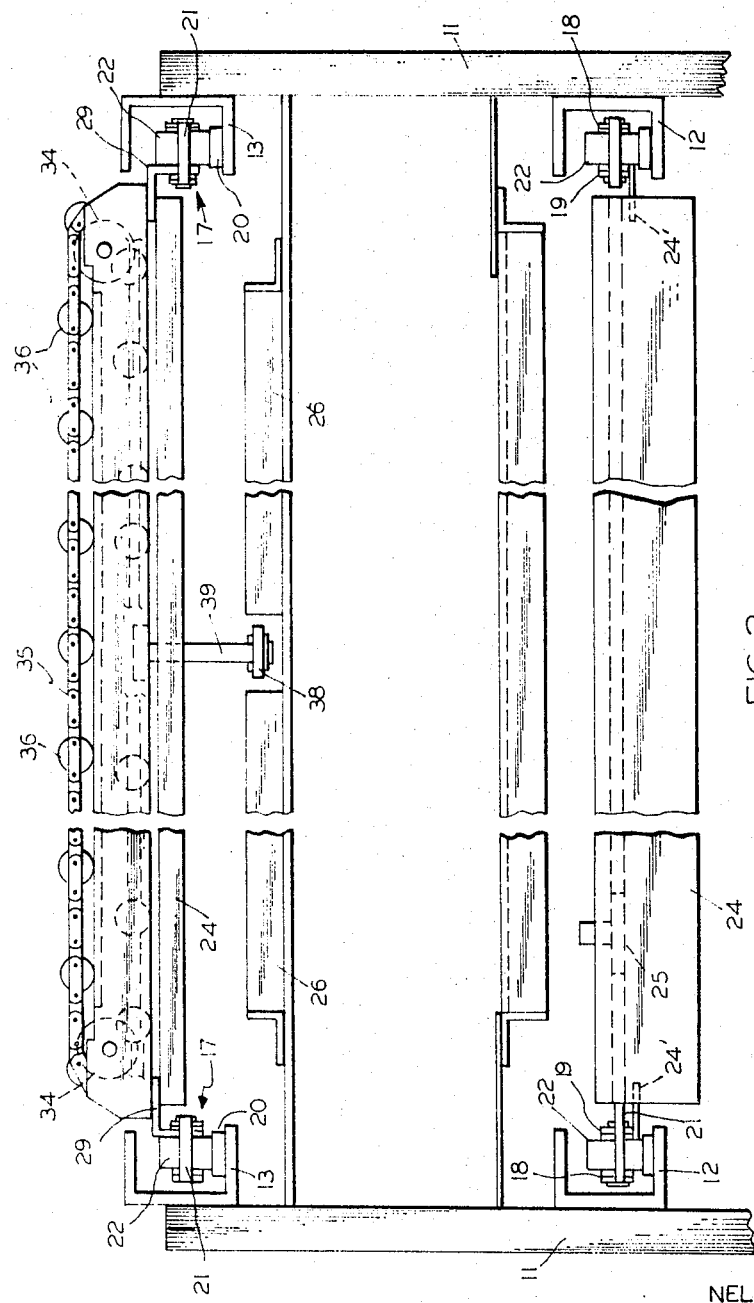
FIG. 2 is a transverse section of a conveyor embodying the invention looking in the direction of movement of the upper course of the conveyor.

Refer first to FIGS. 1A and 2. The conveyor is supported by a frame having upright legs 11 which support horizontal upper and lower side frame members 12 and 13 of channel form which run from one end of the conveyor to the other. A pair of horizontal axis sprocket shafts extends between the sides of the frame at its opposite ends. One of these shafts is shown at 14 in FIG. 1A. One of its supporting bearings is at 15. Sprockets 16 are secured to opposite ends of shaft 14 and carry a pair of roller chains 17. These chains 17 include articulated series of link members 18 and 19. Pins 21 interconnect the articulated links and have rollers 2 journalled thereon. Rollers 22 run along facing strips 20 of nylon or wood or other sound deadening material.

A series of spaced pairs of article carrying platforms 23 and 23a are carried between the chains 17. A plurality of transverse channels 24 is attached between the chains 17 and each carries and guides a control slide member 25. Each channel 24 is mounted in front of each pair of article carrying platforms 23 and 23a.

At each removal station there are two pairs of diverter cam rails. One pair of these cam rails appears in FIG. 2.

The structure of the platforms 23 and 23a and their mounting on chains 17 will be best understood by reference to FIGS. 2, 3 and 4. The platform includes a rectangular frame including end members 27 and side members 28. Each end member 27 is connected at its center to corresponding chain 17 by means of an angle bracket 29 formed integrally with chain link 18. A guide 31 extends from one end member 27 to the other. A slide 32 is mounted to slide along the guide 31. Adjacent each end of the frame there is a sprocket shaft 33, the opposite ends of which are journalled in bearings (not shown) which are carried by the side members 28. Each shaft carries a sprocket 34 at its opposite ends. An endless link chain 35 is trained around each pair of sprockets 34. One of shafts 33 and its bearing may be adjustable to provide means to take up slack in the chains. A series of freely rotatable rollers 36 extends between the upper and lower runs of chains 35. A plate 37 extends from one side member 28 to the other and has its upper surface positioned so that the rollers 36 in the upper run of the articulated, endless series of rollers rest thereon. A channel-form bar 40 extends between the chains 35 and is connected by a vertical shaft 39 to the slide 32 and to cam follower roller 38.

Guide channels 24 are connected to chains 17 by angle brackets 24' formed integrally with link members 18. Each slide 25 includes a vertical pin 41 which actuates the switch controls. These switch controls and the controlled switches are illustrated in FIGS. 5 and 1A. A pair of cam follower guide rails 42 is carried by the conveyor frame at opposite sides of the conveyor. Each guide rail 42 is made of angle iron. The upright leg of the angle iron rail is on the inner edge of each rail. Cutouts are made in the upright legs and switch plates 44 are mounted therein. Each switch plate 44 is carried by a vertical shaft 45 which is journalled in the bearing 46 attached to the guide rail 42. A link 47 is mounted fast on the lower end of each shaft 45. The opposite end of each link 47 is connected by connector links 48 to T-shaped plate 49 shown in FIG. 5. Plate 49 is journalled on vertical axis stub shaft 51. Shaft 51 is sustained by a cross member 52 connected with the guide rails 42. A link 50 extends laterally of the conveyor from one end of the T-plate 49 to link 53 which is connected fast on vertical shaft 54 journalled in a suitable bearing carried by the frame. A control blade 55 is carried at the upper end of the shaft 54 and lies in the same horizontal plane as the pin 41 carried by the slide 25. The lower end of the stem of the T of plate 49 is connected by a link 56 to a link 57 connected fast to a vertical shaft 58. Shaft 58 is journalled in bearing 59 and carries at its upper end a control reset blade 61.

Figure 7:
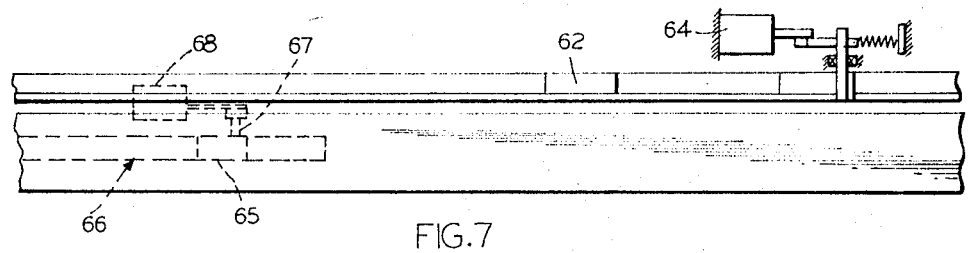
FIG. 7 is a side elevation of the parts shown in FIG. 6.
Figure 6:
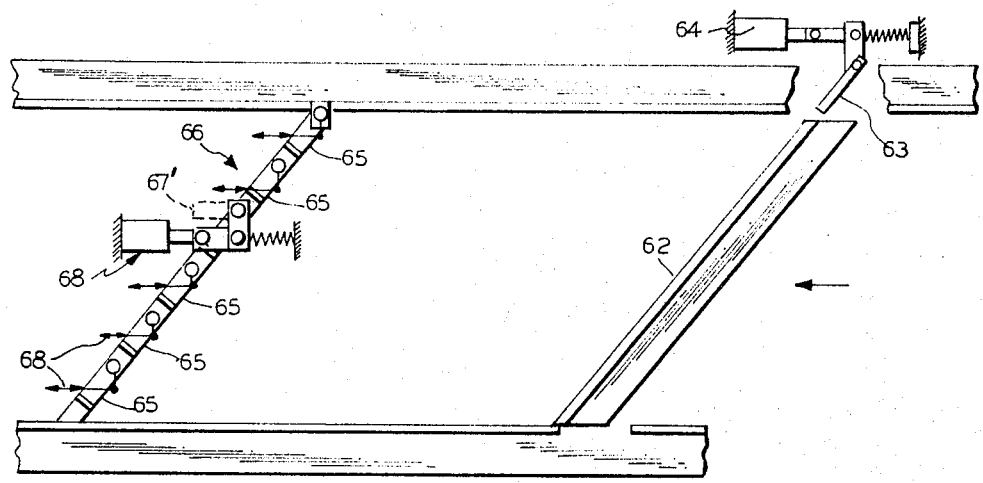
FIG. 6 is a plan view showing the selector cam rail and the station selection control means.

As shown in FIG. 6, the return course of the conveyor includes a selector cam rail 62. All of the cam rollers approach the selector cam rail 62 traveling along the guide rail 42 illustrated at the top of FIG. 6. A selector switch 63 is mounted adjacent the entrance end of selector cam rail 62 and is actuated by a solenoid 64. Following the selector cam rail 62 is a control rail 66 made up of a plurality of pivoted switch sections 65, each mounted on a vertical axis shaft 67 (see FIG. 7) appropriately journalled to part of the conveyor frame. Each shaft 67 is connected to a solenoid 68. Only one solenoid 68 is shown, the others being indicated diagrammatically. Normally, the switch sections 65 are in the positions illustrated in full line. Energization of a solenoid 68 will move the associated switch section to the position shown in broken lines at 67'. As shown in FIG. 7, the selector cam rail 62 and the control rail 66 are at different elevations. The control rail is engaged by the pins 41 and causes them to assume a selected position between the sides of the conveyor so as to engage the control blade 55 at the removal station where the article is to be removed. The selector rail 62 and switch 63 engage the cam rollers and position them selectively on one side or the other of the conveyor. Solenoids 64 and 68 may be controlled by manually operated switches. A suitable circuit is shown in FIG. 8. Each solenoid 68 may be energized by closure of either of two switches 69 or 71. If switch 71 is closed, the solenoid 64 is also energized to move the selector switch 63 between positions in which, respectively, it is effective to transfer the cam rollers 38 onto selector cam rail 62, or is ineffective to transfer the cam rollers 38 from the guide rail 42.

*Operation*

Refer now to the schematic diagram of FIG. 1. The conveyor moves in the direction of the arrow in that figure. The cam rollers 38 will move along the return course and will first engage a fixed return cam rail 72, similar to cam rails 62 and 26 but including no switches. All of the rollers 38 will be moved to the upper side of the conveyor as shown in FIG. 1 regardless of their position as they approach the return cam rail. The pins 41 on slide 25 will engage pin return cam rail 73 and they too will all be returned to the upper edge of the conveyor indicated in FIG. 1. The conveyed article resting on the platform 23 hereinbefore described may be removed from either side of the conveyor at either of two removal stations 74 or 75. Switch 63 will, by its position, determine the direction of removal by causing the cam roller 38 to remain on the same side it is on when it reaches switch 63 or by causing it to move across the conveyor to the other side. The attendant selects a switch 71 or 69 to cause proper positioning of the control cam switch 63. Each switch 69 or 71 is in series with a different solenoid 68. Thus, the particular switch 69 or 71 selected for actuation will determine which switch section 65 moves to the position shown in dotted lines in FIG. 6. The control pin 41 will travel across the control rail 66 until it encounters an opening afforded by the switch section 65 in the dotted line position. It will pass through this opening and will undergo no further lateral movement. The article will be placed on the platform 23 after the cam rollers have been positioned by the selector cam rail 62 and switch 63. The pin 41 reaches the removal station ahead of the platform and will engage a control blade 55 and rotate it from the illustrated position to a position in which it is aligned with the direction of conveyor movement. Rotation of control blade 55 to this new position will, through the linkage illustrated in FIG. 5, move all of the associated switch plates 44 to positions in which they extend outward from shaft 45 across the guide rail 42. At the time this movement of control blades 55 occurs, the cam roller 38 on the leading platform 23 will have passed the first switch blade 44. As movement of the conveyor continues, the cam rollers 38 of the platforms 23 and 23a will be engaged by a switch blade 44 and diverted from guide rail 42 onto the corresponding diverter rail 26. Movement of cam rollers 38 along rails 26 will cause the slides 32 to move along the guide rail 31 toward the center of the conveyor. The bar 40 connected with articulated series of article carrying rollers 36 is attached to the slide 32 and moves laterally with it. Thus, the rollers 36 are moved laterally and in so doing the rollers 36 in the upper run are caused to rotate by plate 37 with which they are in frictional engagement.

The article, which rests on rollers 36, is thus propelled over the side of the conveyor to its intended destination. The article will move at a rate equal to twice that of the slide 32, and therefore the slide 32 and cam roller 38 are effective to remove any article on the platform completely even though they travel only halfway across the conveyor.

Rotation of plate 49 swings the reset blade 61 into a position in which it extends laterally across the centerline of the conveyor. As the cam rollers 38 leave the diverter cam rails 26, they are aligned with the reset blade 61 and will engage that blade to return it and the control linkage and switch blades 44 to the illustrated position, thus conditioning the mechanism to divert a subsequent conveyed article destined for removal at either of the two opposed removal stations served by that control mechanism.

The control blades 55 at each opposed pair of removal stations have positions laterally of the conveyor different from the lateral position of the switch blade 55 at any other pair of removal stations.

The removal mechanism enables the articles to be rapidly removed from the conveyor because of the 2 to 1 ratio of article speed to cam roller speed. This is advantageous because it permits close spacing of the removal stations and because the interval between successive articles can be reduced whereby the sorting capacity of the platform conveyor can be increased.

It will be apparent that cam rollers 38 and the associated slides 32 could be centered by the return cam rail and caused to move outward along diverging cam rails. This would necessitate a change in the controls, but the diverting can also be manually controlled. In such a modification, the switch at the entrance end of the cam rail would perform the function of selector rail 62 and its switch 63.

What is claimed is:
1. In a conveyor, the combination of means forming an endless conveyor apron including a plurality of spaced article-sustaining platforms, each platform comprising a frame having a guideway extending transversely of the conveyor, end members extending longitudinally of the apron at opposite sides thereof and connected with the ends of said guideway, an endless, articulated series of rollers trained around sprockets carried by said frame, said series of rollers including an upper and a lower run extending across the apron, a slide movable along the guideway and connected with the lower run of said series of rollers, and a cam follower depending from said slide; at least one stationary cam rail extending beneath and diagonally substantially halfway across the conveyor and along which said follower moves as incident to conveyor movement whereby said slide is caused to move at least substantially halfway across the apron; and means carried by said frame and providing a surface lying beneath the upper run of said series of rollers and engaged thereby, movement of said guide halfway across the conveyor apron causing an article resting on the upper run between the end members to be completely removed from said platform.

2. The combination defined in claim 1 in which said cam rail extends substantially between one side of the apron and its longitudinal centerline; a secondary stationary cam rail beneath the apron and extending diagonally across the apron substantially between the other side of said apron and its longitudinal centerline and means causing said cam follower to engage a selected one of said rails whereby said articles may be removed from the platform to a selected side of the conveyor.

3. The combination defined in claim 2 in which said stationary cam rails are arranged in side-by-side pairs and the cam followers move inward toward the longitudinal centerline of the apron, the inner ends of the rails being spaced apart laterally a distance at least equal to the size of the cam follower measured laterally of the conveyor; and said means causing the follower to engage a selected cam rail comprises an additional cam rail means effective to position said follower and its associated slide selectively at one end or the other of said guideway before an article is placed on said platform.

4. The combination defined in claim 3 in which said apron has a plurality of laterally aligned pairs of removal stations and a side-by-side pair of stationary cam rails at each removal station; and means effective to cause a selected cam follower to be engaged by a selected cam rail whereby an article can be removed from the platform at any selected removal station.

References Cited

UNITED STATES PATENTS 3,170,572    2/1965    Harrison _____ 209—74
3,384,237    5/1968    Leonard _____ 214—11 X ALLEN N. KNOWLES, *Primary Examiner.*

RICHARD A. SCHACHER, *Assistant Examiner.*

U.S. Cl. X.R.

209—74; 214—11